June 19, 1956

G. W. DOWNS 2,750,794

ACOUSTISONDE APPARATUS FOR MEASURING AND
RECORDING PHYSICAL PROPERTIES OF THE SEA

Filed Nov 7, 1952

INVENTOR
GEORGE W. DOWNS

BY George Sipkin
George E. Pearson
ATTORNEYS

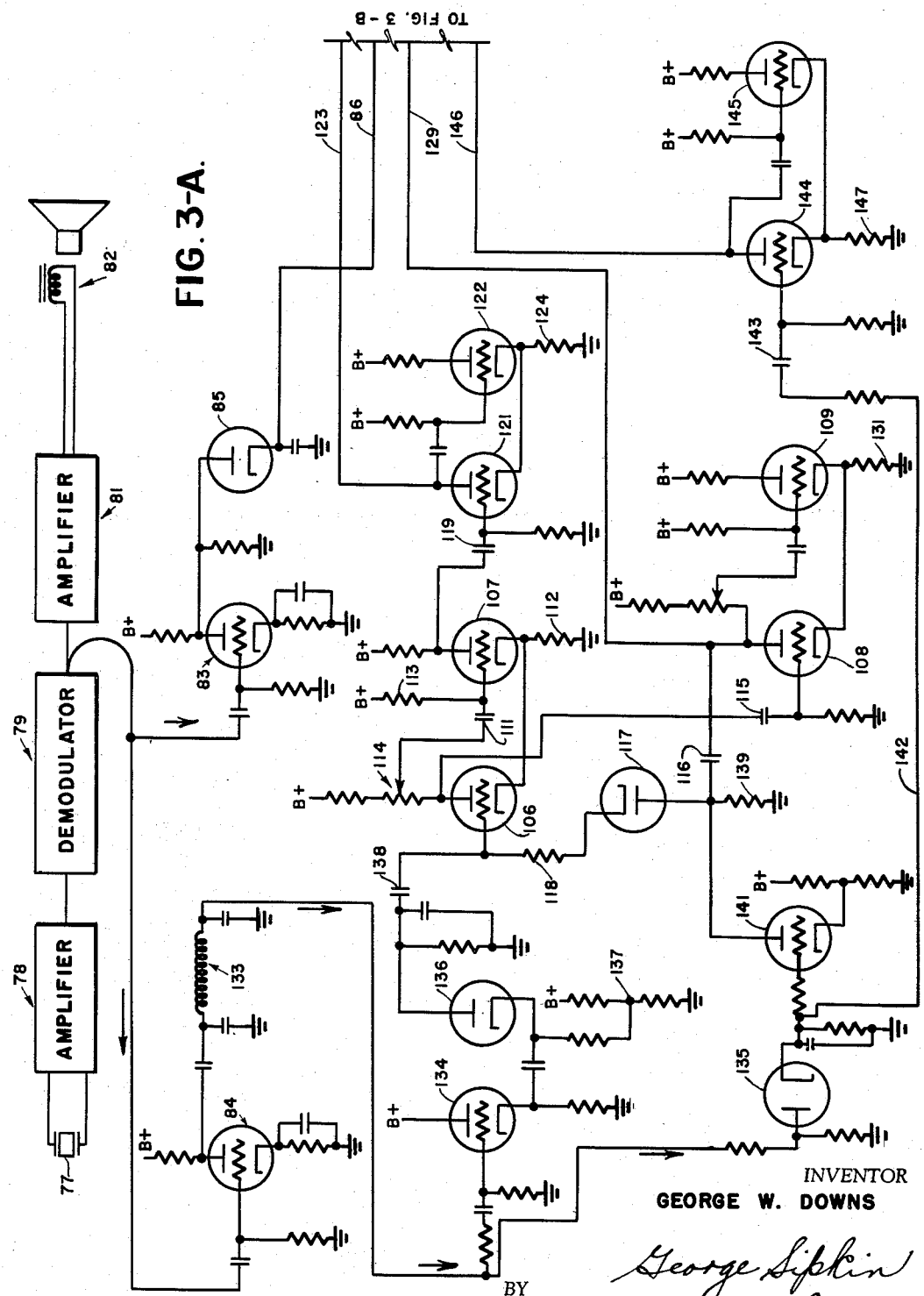

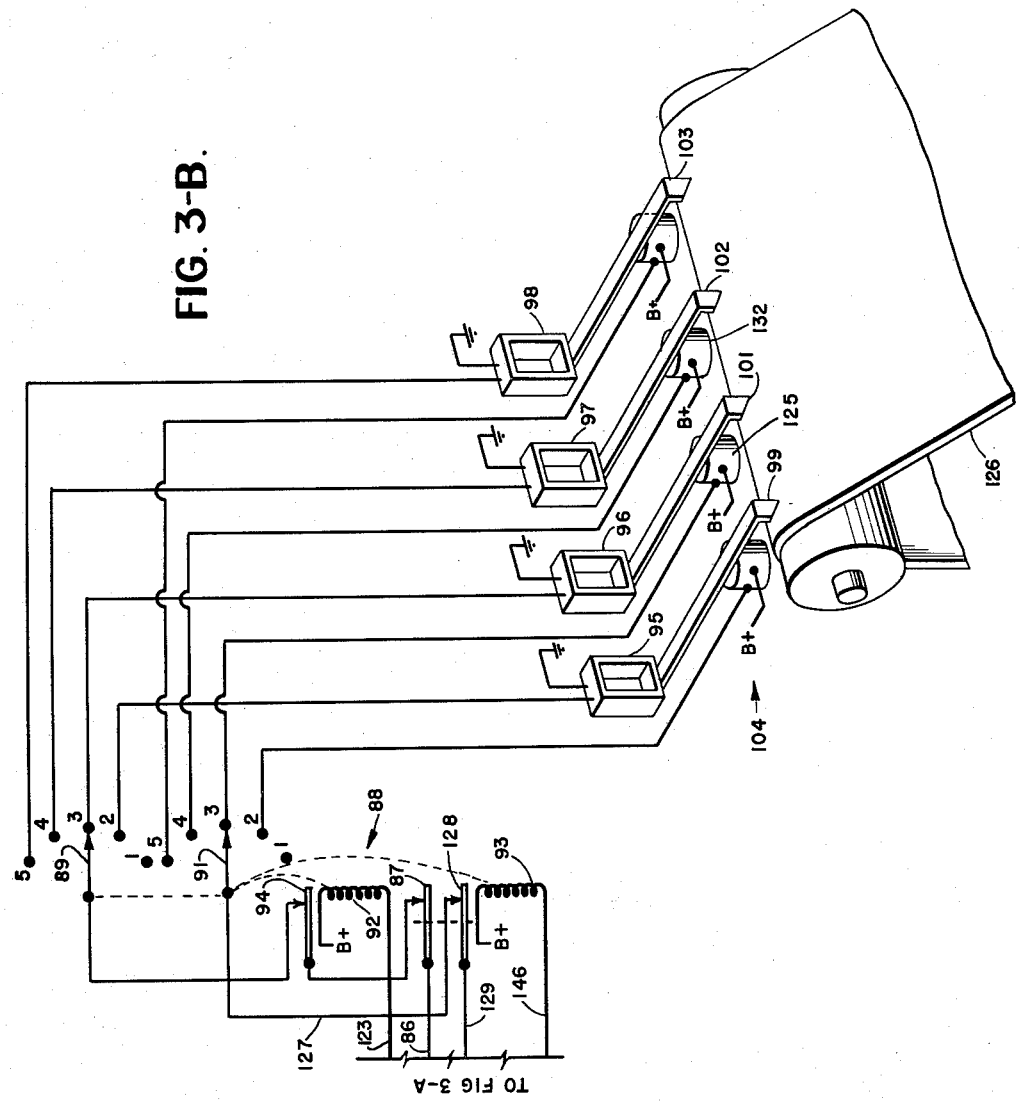

United States Patent Office 2,750,794
Patented June 19, 1956

2,750,794

ACOUSTISONDE APPARATUS FOR MEASURING AND RECORDING PHYSICAL PROPERTIES OF THE SEA

George W. Downs, Altadena, Calif., assignor to the United States of America as represented by the Secretary of the Navy Application November 7, 1952, Serial No. 319,252

11 Claims. (Cl. 73—53)

This invention relates generally to apparatus for measuring and recording properties of the sea and more particularly to a measuring and recording system wherein signals indicative of some conditions of the sea such as pressure, temperature, turbidity, salinity, and radioactivity are detected by submerged apparatus and transmitted as sound through the water to receiving and recording apparatus at the surface thereof.

In oceanographic studies and explorations it frequently is necessary to measure various physical properties of the sea, not only near the surface but also at great depths. Many such measurements have been made heretofore on samples of water brought up from the depths but this method is time consuming and some samplings have required several hours each. It has also been proposed to make measurements by means of electrical equipment lowered into the water and connected by electric cables to indicating and recording devices aboard ship, but the difficulties attending the use of such electric cables prevent the use of this method at great depths.

In accordance with the system of the present invention, the measurements are made continuously and automatically by submerged apparatus, and the results are transmitted by sound through the water to the ship. The submerged apparatus is self-contained and may be lowered on a cable or cast free to send back complete data concerning the measured characteristics from surface to bottom in one cast. Furthermore, the present device may be towed continuously for long periods of time to provide continuous measurement at one depth.

An object of the present invention is the measurement of various physical properties of the sea.

Another object is to measure physical properties of the sea from submerged apparatus and to transmit the measurements by sound through the water to a ship for receiving and recording the measurements.

Another object is to provide a system for measuring, transmitting and recording a plurality of properties of the sea in sequential order.

A further object is to provide a sound transmission system having provision for modulation of a carrier frequency by a plurality of different signal frequencies in sequential order.

Still another object is to provide a system of measuring, transmitting and recording of data having provision of new and improved apparatus for maintaining the received data in step with measured data transmitted in sequential order.

Other objects and many of the attendant advantages of this invention will be readily appreciated as the same becomes better understood by reference to the following detailed description when considered in connection with the accompanying drawings wherein:

Figs. 3–A and 3–B are diagrammatic views which, taken together, illustrate the complete electrical receiving and recording system of the present invention.

Figure 1:
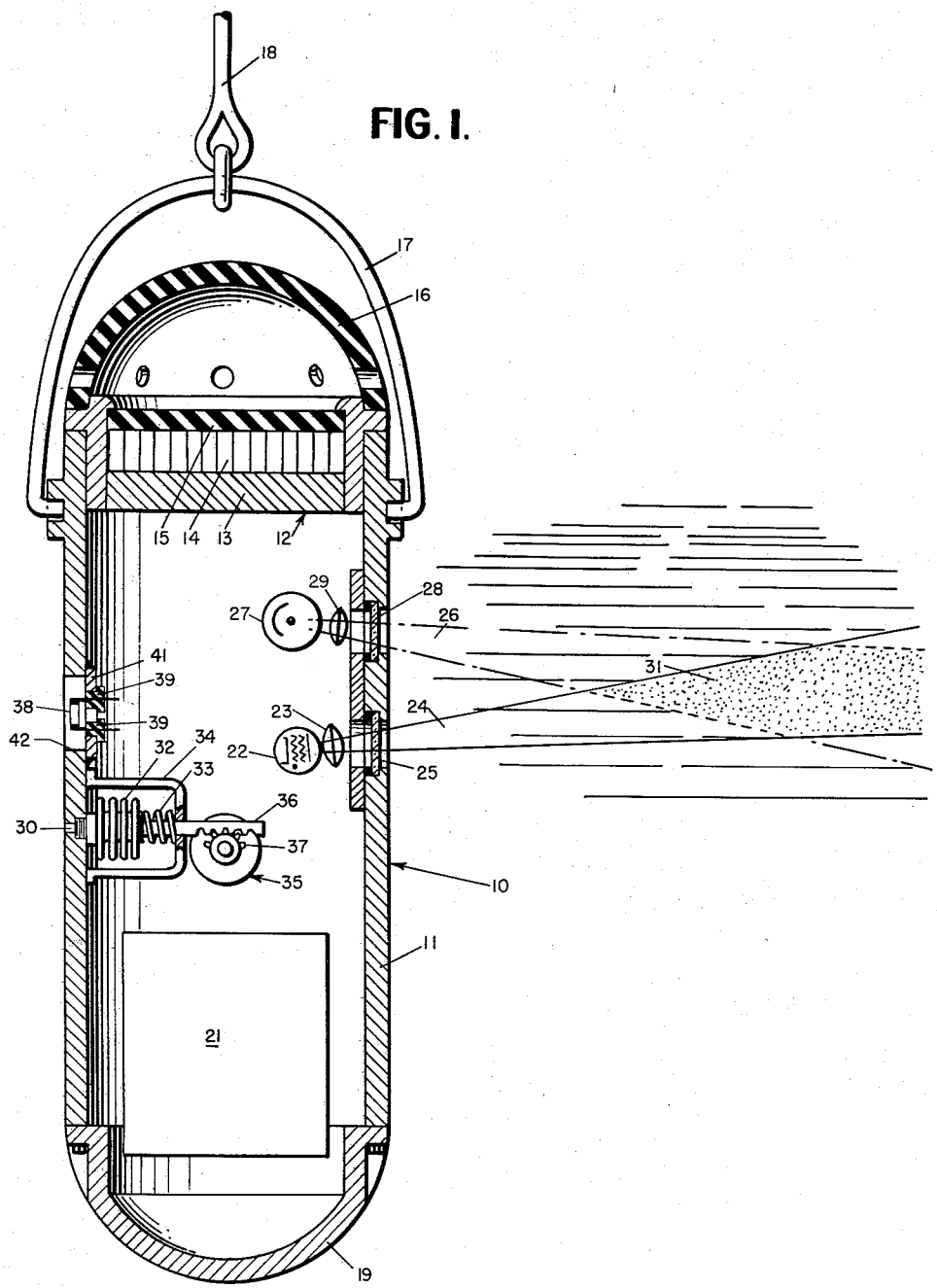
Fig. 1 is a sectional view of the submerged apparatus of the present invention according to the best mode thus far devised for practicing the method of the invention.

Referring now to the drawings and more particularly to Fig. 1 thereof, the submerged apparatus of the present invention is generally designated 10 and comprises a steel cylinder 11 having a diameter of the order of eight inches, a wall thickness of approximately ¾ inch and a length of about five feet. The upper or forward end carries an electro-mechanical transducer or sound transmitter generally designated 12 and formed of piezoelectric construction comprising a steel backing plate 13, a crystal motor 14 and an acoustic rubber window 15. A free-flooding shell 16 constructed of reinforced rubber, and transparent to underwater sound provides streamlining to facilitate raising, lowering, and towing. A bail 17 receives the cable 18. A streamlined cap 19 closes the lower end of the cylinder.

The electric batteries 21, since they constitute some of the heaviest equipment, are placed at the lowermost part of the cylinder 11. The electrical measuring elements are exposed to the sea about midway between the two ends because there, any turbulence due to the motion through the water is least likely to disturb the measurements. A tube 22 and lens 23 project a beam of light 24 out through a window 25. The beam of light 26 picked up from this beam by a photoelectric cell 27 from window 28 and lens 29 constitutes a measure of the turbidity of the water or of the degree to which light is scattered by small particles in the water generally indicated as at 31. A Sylphon bellows 32 is threadedly secured to casing 11 and is in communication with the surrounding water through port 30. The bellows and spring 33 supported in a bracket 34 respond to external water pressure for turning a potentiometer 35 which thus provides a measure of pressure of the water, the driving connection for this purpose comprising a rack and pinion 36 and 37 respectively. A coil 38 of platinum wire or noncorrosive metal is supported on studs mounted in insulating bushings 39, in turn, supported in plate 41 which is secured as by welding to casing 11. The coil 38 is exposed to the sea water to measure temperature, but is recessed in the aperture 42 for mechanical protection. While elements for measuring turbidity, pressure, and temperature of the surrounding water have been disclosed by way of example, it will be understood that additional elements known in the art could be employed in a similar manner to provide measurements of other properties of the sea such as salinity and radioactivity.

Figure 2:
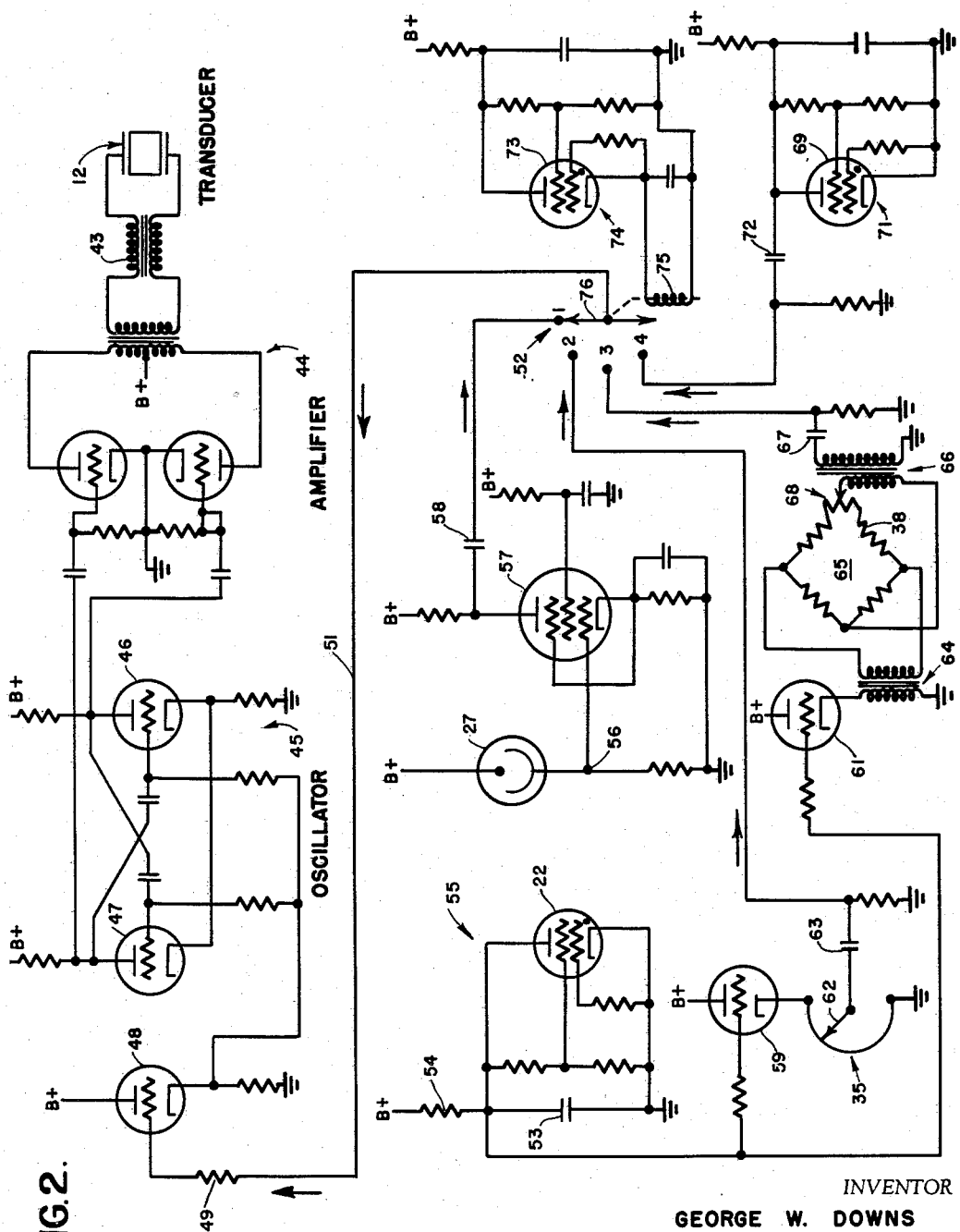
Fig. 2 is a diagrammatic view of the electrical measuring and transmitting system employed in the submerged apparatus.

As shown in Fig. 2, transducer 12 is connected through an impedance-matching inductor 43 to a power amplifier 44 which is driven by an oscillator 45 at a suitable transmission or carrier frequency such as 25 kilocycles per second. The oscillator 45 consists of a positive-bias multivibrator comprising electron tubes 46 and 47. The grid voltage for modulating the carrier frequency is supplied from the cathode follower circuit including tube 48 which is grid controlled by the various measuring devices which are connected to it through resistor 49, conductor 51 and step-switch 52, as will appear in greater detail as the description proceeds. Tube 48 supplies to the grid of tube 46 and 47 a bias which is positive at all times although the grid of tubes 46, 47 are negative approximately half the time. The magnitude of this positive bias determines the repetition rate or frequency of the multivibrator. Variations in this bias result in a substantially linear frequency modulation of the multivibrator output.

The tube 22 which constitutes the light source for the photoelectric measurement of scattered light is a cold-cathode glow-discharge tube capable of passing a heavy current for emitting a brilliant light of short duration. It is known in the art as a strobotron and is connected to a condenser 53 and resistor 54 of such values that it flashes at a suitably high frequency such as 400 cycles per second. Otherwise regarded, tube 22 and its associated condenser and resistors comprise a relaxation oscillator generally designated 55. The 400 cycle flashes are picked up by photocell 27 which produces a 400 cycle pulsating output at 56 which is amplified at tube 57 and conducted by way of condenser 58 to step 1 of switch 52.

The 400 cycle voltage at condenser 53 also drives two cathode followers 59 and 61. Follower 59 energizes the pressure responsive potentiometer 35. The A. C. voltage from the arm 62 of this potentiometer constitutes a measure of depth and is conducted by way of condenser 63 to step 2 of switch 52. Follower 61 supplies 400 cycle A. C. by way of a stepdown transformer 64 to a Wheatstone bridge 65 which includes the temperature-responsive resistor 38. The 400 cycle output of the bridge is coupled by way of transformer 66 and condenser 67 to step 3 of switch 52. The use of the bridge circuit is desirable because small temperature differences are important and consequently an extremely high degree of accuracy is wanted. Balancing-potentiometer 68 is set so that the bridge balances slightly above or below all temperatures that are likely to be encountered on a given cast, because, for the sake of simplicity, no means are provided for indicating the direction or "sense" of the unbalance of the bridge. Since the resistor 38 is exposed to the sea water, the voltage is applied to the bridge through transformer 64 to minimize any influence that the conductivity of the water might have on the circuit, and the two transformers 64 and 66 leave the bridge conductively isolated from the other circuits of the system.

A second strobotron tube 69 comprising a second relaxation oscillator 71 and operating at a suitable low frequency such as 50 cycles per second conducts a marker signal by way of condenser 72 to step 4 of switch 52.

The condition responsive elements 27, 35, and 38 are energized by the 400 cycle sawtooth output and respectively amplitude modulate this output in accordance with the several water conditions to produce information signals which are successively fed to the grid of tube 48. Thus the varying positive bias or modulating signal supplied to the grid of tubes 46, 47 by these condition or information signals has an amplitude indicative of a particular water condition and cyclically varies at 400 cycles per second. Therefore the repetition rate or frequency of multivibrator 45 periodically varies from its natural rate (25 kc.) and this variation recurs at 400 cycles per second (for the condition signals) and 50 cycles per second for the marker signal. During or within each period of this 400 cycle variation, the frequency of the multivibrator varies in accordance with the water conditions as indicated by the amplitude of the modulated 400 cycle signal. In other words the magnitude of the frequency variation of the vibrator output is controlled by the water conditions and this frequency variation (of the 25 kc. repetition rate) itself is repeated at 400 cycles per second. The 50 cycle sawtooth marker signal acts in much the same manner but this signal is not amplitude modulated.

A third strobotron tube 73 comprising a third relaxation oscillator 74 and operating at say 1 cycle per second energizes the driving coil 75 of switch 52 so that its switch arm 76 moves from one step to the next, once each second for repeatedly transmitting the four signals in turn. Each signal is A. C. and modulates the frequency of oscillator 45 in accordance with its own amplitude and frequency.

Fig. 3-A shows apparatus for use aboard ship for receiving and recording the measurements transmitted by the apparatus of Figs. 1 and 2. The signal is picked up by an underwater transducer or hydrophone 77, amplified at 78 and de-modulated at 79 to reproduce the original signals that were applied to the follower stage 48 of Fig. 2. An amplifier 81 and speaker 82 make these audible for monitoring the operation of the recorder. The demodulated signal is applied also to two amplifiers 83 and 84. The output of amplifier 83 is rectified at diode 85 and applied by way of conductor 86 to an arm 87, Fig. 3-B, of a step switch 88.

This step switch advances its contact arms 89 and 91 from one step to the next in response to each energization of its advancing coil 92, and releases or returns the contacts quickly from any advanced position to its starting position when its release coil 93 is energized. This switch connects the signal circuit from diode 85 by way of conductor 86, arm 87 and its break contact, arm 94 and its break contact, contact arm 89, and step contact 2, 3, 4, or 5 of the switch 88 to coils 95, 96, 97 and 98 that actuate styli 99, 101, 102 and 103 respectively of a graphic recorder 104. Switch arms 94 and 87 actuated by coils 92 and 93 respectively open this signal circuit while the contact arms 89 and 91 are being advanced or released.

This apparatus, in order to record the data transmitted by the apparatus of Figs. 1 and 2 must move the arms 89 and 91 one step each second. This timing is controlled by a pair of trigger circuits employing electron tubes 106, 107 and 108, and 109. In the trigger 106—107, tube 107 normally conducts. A positive pulse applied to the grid of tube 106 makes that tube begin conducting so that a negative pulse is transmitted by way of condenser 111 to the grid of 107 to reduce the current there. Since the two tubes have a common cathode resistor 112, the reduction of current through tube 107 tends to lower the cathode voltage of tube 106 and further increase the current there. This cumulative action causes the current to transfer abruptly from tube 107 to tube 106 and to leave the grid of tube 107 far below the cut-off voltage. Under this condition the grid is substantially non-conducting so that the current through grid load resistor 113 raises this grid voltage at a rate determined by the values of this resistor 113 and the coupling condenser 111. When the grid voltage of tube 107 is thus brought above the cut-off value, the tube begins to draw current, whereupon the total current is abruptly transferred back to tube 107 to leave tube 106 non-conducting again. The potentiometer 114 permits an adjustment of the voltage fed from the plate circuit of tube 106 through condenser 111 to the grid of tube 107 and so provides a convenient means for adjusting the time between the two trigger operations.

The pair of tubes 108 and 109 constitute a similar trigger device, adapted to be set off by a positive pulse from the plate of tube 106 by way of condenser 115. The negative pulse transmitted from tube 106 when it begins conducting has no effect on tube 108 because it is already nonconducting. But when tube 106 stops conducting, the resulting positive pulse from tube 106 triggers tubes 108 and 109. When they trigger back, a positive pulse is transmitted from the plate of tube 108 through condenser 116 and diode valve 117 to the grid of tube 106 by way of resistor 118.

Thus trigger circuits 106—107 and 108—109 operate repeatedly in turn, the first taking about .8 second and the other about .2 second so that the two together can stay in step with the received under-water signals. At the same time they control the step switch 88 and recorder 104 as follows: When tube 107 stops conducting (at the beginning of the one-second interval) it transmits a positive pulse by way of condenser 119 to the trigger pair 121—122 of which 121 is normally nonconducting and 122 is normally conducting, to cause tube 121 to begin conducting, and thereby energize the advance coil 92 of switch 88 so that contact arms 89 and 91 are moved up one step, the circuit being traced from B+ potential on coil 92, conductor 123, tube 121, and resistor 124 to ground. Tubes 121 and 122 trigger back in approximately .1 of a second. When tube 108 begins conducting near the end of the one-second interval, the coil 96 (for example) will have had time to bring stylus 101 to rest at the proper position for recording. Accordingly, pull-down coil 125 is energized from the plate of tube 108 through arm 91 of step switch 88 to pull stylus 101 against the paper 126 to mark it, the circuit for this purpose being traced from B+ potential on pull-down coil 125, contact 3 and switch arm 91, conductor 127, break contact and contact arm 128 of switch 88, conductor 129, tube 108, and resistor 131 to ground. At the end of the one-second interval the cycle repeats and advances switch arms 89 and 91 for energizing coils 97 and 132 of the recorder 104.

When a 50 cycle signal from tube 69 of Fig. 2 is received at amplifier tube 84 of Fig. 3 it passes through the low-pass filter 133 to tubes 134 and 135. The output of tube 134 is rectified at diode valve 136 to deliver a negative voltage. A positive bias from voltage divider 137 prevents this diode from operating in response to a low intensity A. C. signal such as any 400 cycle signals that may come through filter 133. Thus when the 50 cycle signal starts, a strong negative pulse is applied through condenser 138 to the grid of tube 106 to make it stop conducting, and tube 107 will send a similar negative pulse to tube 121 to make it stop conducting. If tube 106 should happen to be nonconducting at the time, the negative pulse produces no effect. During the one second that the 50 cycle signal lasts, the negative charge will drain off condenser 138 through diode 117 and resistor 139 so that when the 50 cycle signal stops the resulting positive pulse applied to the grid of tube 106 will swing it far enough positive to trigger it and so start the cycle of automatic operation previously described.

When the 50 cycle signal starts, tube 108 may be conducting, or it may be started by a pulse from tube 106. In either case it will automatically stop conducting within .2 second, but in so doing will transmit a positive pulse through condenser 116. Tube 141 absorbs this pulse to prevent it from reaching the grid of tube 106. In the absence of the 50 cycle signal, tube 141 is biased beyond cut-off so as not to interfere with the transmission of pulses from tube 108 to tube 106. But while the strong 50 cycle signal is being applied, diode 135 applies a positive voltage to the grid of tube 141 to make it conduct. The presence of diode 117 makes certain that the positive pulse from diode 136 for starting tube 106 at the end of the 50 cycle tone, cannot be shunted off through tube 141.

The positive voltage from diode 135 is applied also by way of conductor 142 and condenser 143, to tube 144 for energizing reset coil 93 of step switch 88. In the absence of the 50 cycle signal, tube 144 is nonconducting and 145 is conducting so that coil 93 is not energized. These two tubes operate in the same manner as do tubes 121 and 122 and maintain coil 93 energized for approximately ½ second, long enough for the arms 89 and 91 to return to their initial position, but preferably less than the full second during which the 50 cycle signal will continue. The circuit for energizing reset coil 93 is traced from B+ potential on reset coil 93, conductor 146, tube 144, and resistor 147 to ground. Contacts 128, opened by reset coil 93 make certain that no mark is made on the paper 126 during the 50 cycle signal.

When coil 93 is energized, the arms 89 and 91 return to their lowermost step positions 1. Those positions are blank because the arms are to be advanced by coil 92 immediately after the 50-cycle signal ends.

A receiving system, as shown in Figs. 3–A and 3–B, even if built for recording four or more measurements will receive and record properly the three measurements from the apparatus of Figs. 1 and 2 because the step switch 88 can be reset from any position so that the excess recording styli simply are left idle. Obviously the interval of one second between operations of step switch 52 in the transmitter of Fig. 2 need not be maintained with a high degree of accuracy. Not only can the receiving apparatus tolerate considerable lack of synchronism, but also, an attendant listening to the speaker 82 while watching recorder 104 can detect large errors and adjust potentiometer 114 to correct them.

In the operation of the aforedescribed system which conveniently may be referred to as an acoustisonde, whether the apparatus of Fig. 1 is towed by or lowered from a line such as cable 18 or cast free for descent to the bottom, the measurements of such conditions, for example, as turbidity, pressure, and temperature are taken continuously by the condition responsive elements respectively individual thereto. These measurements are converted to electrical signals of predetermined frequency, each having its own amplitude, and these signals together with a marker signal at a different frequency are applied in sequential order for frequency modulation of a carrier suitable for transmission of the signals through the surrounding water.

The transmitted signals are received on shipboard and demodulated. The demodulated signals are recorded by styli individual thereto which are operatively connected to the signals selectively in step with the sequential order of occurrence thereof, the aforesaid marker signal serving to repeat the sequential connection of the signals and styli each to each other and to serve as a check on variations in the time spacing of the locally generated styli transfer operations or switching operations with respect to the signal sequence. The demodulated signals are also rendered audible for monitoring the recording operations so that the attendant can adjust the time spacing of the styli transfer operations to bring the same into step, if necessary, with the signal sequence.

Obviously many modifications and variations of the present invention are possible in the light of the above teachings. It is therefore to be understood that within the scope of the appended claims the invention may be practiced otherwise than as specifically described.

I claim:

1. Apparatus of the character disclosed comprising a submarine casing, a relaxation oscillator in said casing for generating electrical pulses at a predetermined frequency, a plurality of condition responsive means in said casing, means energized by said electrical pulses and including said condition responsive means for generating a plurality of information signals at said predetermined frequency and individually indicative of selected water conditions, a second relaxation oscillator for generating a marker signal at a second predetermined frequency, an electroresponsive stepper switch movable to successive switch positions in response to electrical pulses received thereby in successive order, a third relaxation oscillator for supplying said last named electric pulses to said stepper switch in predetermined successive order, an oscillator for generating a carrier frequency suitable for transmitting sound signals though the water, means including said stepper switch for modulating said carrier frequency with said information signals and said marker signal in said predetermined successive order, and means for transmitting said modulated carrier frequency through the water.

2. An acoustisonde system of the character disclosed comprising means for generating a plurality of signals at a first predetermined frequency and respectively indicative of physical properties of the sea, means for generating a marker signal at a second predetermined frequency, means for generating a carrier frequency, means for modulating said carrier frequency with said plurality of signals and said marker signal repeatedly in predetermined successive order, means including a transducer for transmitting said modulated carrier frequency through the water, a submarine casing for housing the means aforesaid, means on the surface of the water and including a transducer in communication with the water for receiving said transmitted carrier frequency, means for demodulating the received carrier frequency to recover said plurality of signals and said marker signal, an electro-responsive stepper switch having rotatable wiper contact means and an advance coil for moving the wiper contact means ahead to successive switch positions in response to successive pulses received by the advance coil and a reset coil for restoring the wiper contact means to the initial position thereof in response to a pulse received by the reset coil, a pulse generator for supplying pulses to said advance coil to advance said wiper contact means substantially in step with said successive order of occurrence of said signals, said stepper switch having a plurality of contacts respectively stationed at said switch positions and engageable by said wiper contact means, a plurality of signal recorders connected respectively to said stationary contacts, circuit means including a diode detector connecting said wiper contact means to said demodulating means for respectively operating said recorders by said plurality of signals in step therewith as said contact means advances, means for filtering said recovered signals to separate said marker signal therefrom, means controlled by the separated marker signal for pulsing said reset coil in step therewith, means controlled by said separated marker signal for stopping said pulse generator while said reset coil is pulsed, first switch means on the stepper switch for interrupting said circuit means while the wiper contact means is being advanced, and second switch means on the stepper switch for interrupting the circuit means while the wiper contact means is being reset to the initial position.

3. An acoustisonde system as in claim 2 in which said stepper switch comprises two banks of stationary contacts and two wiper contacts individual to said banks respectively and connected mechanically together for advance as a unit by the advance coil, said plurality of recorders each comprises recording paper, a stylus, a coil connected to one of the contacts of one of said banks for positioning the stylus on the paper when energized through said one of the contacts, and a coil connected to one of the contacts of the other of said banks for energization by one of said plurality of signals, the wiper contact for said last named bank being connected to said diode, said pulse generator comprising three pairs of trigger devices, one of said pairs of trigger devices being connected to trigger the other two and one of the two being connected to trigger the first, each pair of trigger devices comprising a pair of electron discharge devices connected normally conducting and nonconducting respectively and including time delay means for rendering the discharge devices alternately conducting and nonconducting for predetermined intervals of time, the wiper contact for said one of the banks being connected to the normally nonconducting device of the other of said two of the trigger pairs whereby the positioning coils are energized in succession through said last named device when the same is rendered conducting, and said advance coil being connected to the normally nonconducting device of said one of the other two pairs whereby the advance coil is energized while said last named device is conducting.

4. In a receiver and recorder of signals transmitted repetitively in successive order and including a marker signal at a different frequency, the combination of means for receiving said signals, a plurality of recorders individual respectively to said signals having the same frequency, each said recorder comprising recording paper, a stylus, a coil for positioning the stylus on the paper when the coil is energized, and a signal responsive coil for driving the stylus across the paper, a stepper switch having two banks of contacts connected respectively to the positioning and driving coils of said recorders, a pair of movable wiper arms mechanically connected together and engageable respectively with the contacts of said banks, means connecting one of said wiper arms to said receiving means, an advance coil for advancing the wipers one contact at a time in response to successive pulses received by the advance coil, and a reset coil for releasing the wipers for return to the initial positions thereof when the reset coil is pulsed, a pulse generator having means for supplying short period pulses to said advance coil substantially in step with the successive order of recurrence of the signals and means connected to the other of said wipers for supplying longer period pulses to the positioning coils through the other of said wipers during the periods between said short period pulses, means connected to the receiving means for filtering said marker signal from the other signals, means responsive to the marker signal for pulsing said reset coil, and means responsive to the marker signal for stopping said pulse generator while the reset coil is pulsed.

5. Apparatus as in claim 4 further characterized by first switch means on the stepper switch for interrupting said means connecting the receiving means to said one of the wiper arms while the wiper arms are being advanced, second switch means on the stepper switch for interrupting said last mentioned connecting means while the wipers are being reset, and third switch means on the stepper switch for interrupting said means for connecting said other of the wipers to the pulse generator while the wipers are being reset.

6. In a device of the class described, a source of repetitively transmitted groups of signals, each group including a plurality of consecutive information signals and a marker signal transmitted in a predetermined order, means for receiving said signals, means for indicating the received information signals of each group in said predetermined order, and means responsive to the received marker signal of each group for effecting repetitive operation of said indicating means at the transmitted group repetition rate, said information signals comprising a portion of a carrier modulated by signals having a first frequency and said marker signal comprising another portion of said carrier modulated by a signal having a second frequency.

7. The device of claim 6 wherein said source includes a first oscillator for generating said carrier, a second oscillator for generating a plurality of modulating signals having said first frequency, a plurality of condition responsive means for respectively amplitude modulating each of said modulating signals, and means cyclically operable at said group repetition rate for feeding groups of said amplitude modulated signals to said first oscillator at group repetition rate.

8. The device of claim 7 wherein said source includes a third oscillator for generating a modulating signal having said second frequency, and means for repetitively feeding said last mentioned signal to said first oscillator at group repetition rate.

9. Apparatus of the character disclosed comprising a first oscillator for generating a plurality of modulating signals having a first frequency, a plurality of condition responsive means for respectively amplitude modulating said signals in accordance with a plurality of conditions to be indicated, a second oscillator for generating a marker signal having a second frequency, a third oscillator for generating a carrier signal, means for repetitively feeding said amplitude modulated signals and said marker signal to said third oscillator in predetermined successive order to frequency modulate said carrier signal, said first oscillator including a glow tube for generating light pulses at said first frequency, said condition responsive means including light sensitive means for receiving a portion of the light of said pulses reflected by media external to said apparatus and generating an electric signal at said first frequency indicative of the strength of received light.

10. The apparatus of claim 1 wherein said condition responsive means includes a temperature responsive element, a bridge circuit including said element for generating an electrical output indicative of temperature to be indicated, and transformer means for coupling said bridge circuit with said first oscillator and with said stepper switch.

11. In a device of the class described, a source of groups of signals repetitive at group repetition rate, each group including a plurality of information signals and a marker signal transmitted in a predetermined order, indicating means, cyclical switch means for successively feeding said information signals to said indicating means in said order, means for effecting step by step actuation of said switch means from an initial position, and means independent of the position of said switch means and responsive to said marker signal for resetting said switch means at said initial position at said group repetition rate.

References Cited in the file of this patent

UNITED STATES PATENTS

| Number | Name | Date |
| --- | --- | --- |
| 1,929,241 | Franklin | Oct. 3, 1933 |
| 2,283,429 | Ennis | May 19, 1942 |
| 2,295,570 | Dunmore | Sept. 15, 1942 |
| 2,380,520 | Hassler | July 31, 1945 |
| 2,414,862 | Fearon | Jan. 28, 1947 |
| 2,419,914 | Pamphilon | Apr. 29, 1947 |
| 2,425,868 | Dillon | Aug. 19, 1947 |
| 2,436,563 | Frosch | Feb. 24, 1948 |
| 2,466,804 | Giffen et al. | Apr. 12, 1949 |
| 2,547,875 | Krasnow | Apr. 3, 1951 |
| 2,611,085 | Masson | Sept. 16, 1952 |
| 2,623,170 | Dickinson | Dec. 23, 1952 |